United States Patent
Tian et al.

(10) Patent No.: US 12,158,554 B1
(45) Date of Patent: Dec. 3, 2024

(54) HIGH-PRECISON MODELING METHOD AND SYSTEM OF THREE-DIMENSIONAL VELOCITY FIELD FOR PRECISE NAVIGATION OF DEEP OIL AND GAS

(71) Applicant: Institute of Geology and Geophysics, Chinese Academy of Sciences, Beijing (CN)

(72) Inventors: Fei Tian, Beijing (CN); Qingyun Di, Beijing (CN); Wenhao Zheng, Beijing (CN); Yongyou Yang, Beijing (CN); Wenjing Cao, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/607,365

(22) Filed: Mar. 15, 2024

(30) Foreign Application Priority Data

Oct. 19, 2023 (CN) .......................... 202311353154.4

(51) Int. Cl.
*G01V 1/28* (2006.01)
*G01V 1/30* (2006.01)

(52) U.S. Cl.
CPC .............. *G01V 1/282* (2013.01); *G01V 1/305* (2013.01); *G01V 2210/6222* (2013.01)

(58) Field of Classification Search
CPC . G01V 1/282; G01V 1/305; G01V 2210/6222
See application file for complete search history.

(56) References Cited

U.S. PATENT DOCUMENTS

| | | | |
|---|---|---|---|
| 9,772,413 B2* | 9/2017 | Krohn | G01V 1/3808 |
| 2021/0026028 A1* | 1/2021 | Thorne | G01V 1/301 |
| 2021/0055436 A1* | 2/2021 | Wu | E21B 49/00 |
| 2021/0064800 A1* | 3/2021 | Causse | G06F 30/20 |
| 2021/0255345 A1* | 8/2021 | Liu | E21B 49/00 |
| 2021/0302608 A1* | 9/2021 | Tan | G01V 1/34 |
| 2023/0095632 A1 | 3/2023 | Wang et al. | |
| 2023/0350088 A1* | 11/2023 | Cao | G01V 1/282 |

FOREIGN PATENT DOCUMENTS

| | | |
|---|---|---|
| CN | 104407382 A | 3/2015 |
| CN | 112596107 A | 4/2021 |

* cited by examiner

*Primary Examiner* — Krystine E Breier
(74) *Attorney, Agent, or Firm* — Nitin Kaushik (57) ABSTRACT

The present invention belongs to the field of deep navigation, and in particular to a high-precision modeling method and system of three-dimensional velocity field for precise navigation of deep oil and gas. The present invention includes: extracting wave impedance characteristics based on standardized well logging data to obtain a wave impedance curve; acquiring a velocity vector of each location at current depth, to obtain a one-dimensional velocity curve; based on the one-dimensional velocity curve, training a velocity value prediction model based on wave impedance at the current depth; performing wave impedance inversion based on the wave impedance curve at the current depth to obtain a wave impedance inversion data volume; and based on the wave impedance inversion data volume, through the velocity value prediction model based on wave impedance at the current depth, acquiring a three-dimensional high-accuracy velocity volume.

5 Claims, 1 Drawing Sheet

Acquire well logging data, process outliers, and perform standardization to obtain standardized well logging data

↓

Extract wave impedance characteristics based on the standardized well logging data to obtain a wave impedance curve

↓

Perform well-to-seismic calibration based on the wave impedance curve to obtain time-depth conversion relationship

↓

Based on the time-depth conversion relationship, acquire a velocity vector of each location at current depth by a time window with a set size, to obtain a one-dimensional velocity curve

↓

Based on the one-dimensional velocity curve, train a velocity value prediction model based on wave impedance at the current depth

↓

Perform wave impedance inversion based on the one-dimensional velocity curve at the current depth to obtain a wave impedance inversion data volume

↓

Based on the wave impedance inversion data volume, through the velocity value prediction model based on wave impedance at the current depth, acquire a three-dimensional high-accuracy velocity volume

HIGH-PRECISON MODELING METHOD AND SYSTEM OF THREE-DIMENSIONAL VELOCITY FIELD FOR PRECISE NAVIGATION OF DEEP OIL AND GAS

CROSS-REFERENCE TO RELATED APPLICATIONS

The application claims priority to Chinese patent application No. 2023113531544, filed on Oct. 19, 2023, the entire contents of which are incorporated herein by reference.

TECHNICAL FIELD

The present invention belongs to the field of deep navigation, and in particular to a high-precision modeling method and system of a three-dimensional velocity field for precise navigation of deep oil and gas.

BACKGROUND

A deep precise navigation technology can be used for deep oil and gas exploration, and guiding drilling personnel to optimize a well trajectory to a designated location of an oil and gas reservoir to obtain the maximum well drainage area and the best recovery ratio, and becomes a cutting-edge technology to improve oil and gas production per well and oilfield development benefits.

In the patent of the present invention, mapping relationship between a well logging curve of a single well and three-dimensional seismic data is established, a one-dimensional velocity curve of the single well is reasonably extrapolated to three-dimensional space between wells, and a matching problem of time-depth relationship in well trajectory design of a well to be drilled is solved.

SUMMARY

In order to solve the above-mentioned problems in the prior art, namely the problem of velocity calculation deviation caused by instruments and well condition factors in a three-dimensional velocity curve obtained in the prior art, the present invention provides a high-precision modeling method of a three-dimensional velocity field for precise navigation of deep oil and gas, and the method includes:

step S100, acquiring well logging data, processing outliers, performing standardization to obtain standardized well logging data, and acquiring seismic data;

step S200, extracting wave impedance characteristics based on the standardized well logging data to obtain a wave impedance curve;

step S300, performing well-to-seismic calibration based on the wave impedance curve and the seismic data to obtain time-depth conversion relationship;

step S400, based on the time-depth conversion relationship, acquiring a velocity vector of each location at current depth by a time window with a set size, to obtain a one-dimensional velocity curve, step S500, based on the one-dimensional velocity curve, training a velocity value prediction model based on wave impedance at the current depth;

step S600, performing wave impedance inversion based on the one-dimensional velocity curve at the current depth to obtain a wave impedance inversion data volume, and step S700, based on the wave impedance inversion data volume, through the velocity value prediction model based on wave impedance at the current depth, acquiring a three-dimensional high-precision velocity volume.

In some preferred implementations, a method for obtaining the standardized well logging data includes:

step A10, using the well logging data as a dataset X to be processed;

step A20, randomly extracting $\varphi$ data points from the dataset X to be processed, to form a data subset X' to be processed, and storing the data subset to be processed in a root node;

step A30, randomly selecting a dimension q from the dataset X to be processed, and randomly generating a split point p in the dimension q, where the split point p satisfies $\min(x_{ij}, j=q, x_{ij} \in X') < p < \max(x_{ij}, j=q, x_{ij} \in X')$, and j represents a serial number of the split point;

step A40, generating, based on a split point p, a hyperplane that divides data in the dimension q into two subspaces, and placing data points with values smaller than p in the dimension q into the first leaf node, and data points with values greater than or equal to p into the second leaf node;

step A50, performing recursion on the methods described in steps A30 to A40 until all the leaf nodes have only one data point or isolation trees have reached a preset height;

step A60, repeating the methods described in steps A30 to A50 until T isolation trees are generated, where the T isolation trees represent: each of the isolation trees has no external node of a leaf node, or has two leaf nodes $\{T_l, T_r\}$ and one internal node test; the internal node test of each of the T isolation trees consists of the dimension q and a split point p, the points with q<p belong to $T_l$, and otherwise, the points belong to $T_r$;

step A70, calling the T isolation trees an isolation tree forest, letting each data point $x_i$ traverse through each isolation tree, and calculating heights $h(x_i)$ of the data points $x_i$ in each isolation tree, namely the number of edges that the data points $x_i$ pass through from the root node to the leaf nodes of the isolation tree where the data points are located; and thus, calculating the average height of the data points $x_i$ in the isolation tree forest, and normalizing the average heights of all the data points to obtain a normalized average height $\overline{h(x_l)}$ of the data points;

step A80, calculating an outlier score $s(x, \varphi)$ based on the normalized average height $\overline{h(x_l)}$ of the data points;

$$s(x, \varphi) = 2^{\frac{E(\overline{h(x_l)})}{\overline{c(\varphi)}}}$$

where $\overline{c(\varphi)}$ represents a mean value of the binary tree path lengths constructed by $\varphi$ data points, and $E(*)$ represents an expectation;

$$\overline{c(\varphi)} = \begin{cases} 2H(\varphi-1) - \frac{2(\varphi-1)}{\varphi}, & \varphi > 2 \\ 1, & \varphi = 2 \\ 0, & \varphi < 2 \end{cases}$$

H(i) represents a harmonic number, and is estimated through $\ln(i)+0.5772156649$, and $0.5772156649$ is Euler's constant; and when the outlier score $s(x, \varphi)$ is less than a preset outlier threshold, removing the corresponding data points to obtain well logging data $C=\{c_1, \ldots, c_\alpha, \ldots, c_m\}$, $1 \le \alpha \le m$, and $c_\alpha \in C$ without outliers, where I represents the number of the data points in the well logging data without outliers; and step A90, standardizing the continuous well logging data without outliers to obtain standardized well logging data:

$$c_z^s = \frac{(g_z^s - \text{Average}(g^s))}{v^s}$$

where $g_z^s$ represents a data value of the $z^{th}$ sampling point on the $s^{th}$ type of curve, and Average represents the calculated mean value; $g^s$ represents all data sample points on the $s^{th}$ type of curve; $v^s$ represents a variance of a $s^{th}$ type of curve; and $c_z^s$ represents the data value of the $z^{th}$ sampling point on the $s^{th}$ type of curve after standardization.

In some preferred implementations, step S200 includes:
selecting a standardized compensation acoustic curve AC and a standardized density curve DEN based on the standardized well logging data, and calculating a wave impedance curve IMP of a target well:

IMP=DEN/AC.

In some preferred implementations, a method for obtaining time-depth conversion relationship includes:
tracking wave peak points of reflection events based on the well logging data, constructing a continuous surface of the reflection events, then determining the reflection event where a marker bed is located, and constructing isochronous three-dimensional distribution of the marker bed;

obtaining a wave impedance curve by multiplying an acoustic time difference curve by a density curve in the well logging data of each known well location, and then calculating a reflection coefficient curve;

constructing a ricker wavelet based on dominant frequency of seism in a target interval, and performing convolution computation on the ricker wavelet and the reflection coefficient curve to obtain a synthetic seismogram;

enabling depth data of a marker bed at a borehole of each drilling well location to correspond to a three-dimensional distribution model of the marker bed, calculating correlation of seismic data after the synthetic seismogram overlays a near-well seismic trace, when waveform correlation is higher than a first relevant threshold, completing well-to-seismic calibration, and finally obtaining time-depth conversion relationship between well logging depth and two-way travel time of seismic reflection waves:

$$T_d = T_{H_0} + 2 \sum_{Z_{between}=1}^{n_{between}} T_{Z_{between}} \cdot \Delta H$$

where $T_{H_0}$ represents two-way travel time of seismic data corresponding to depth of an acoustic well logging marker bed; $T_{Z_{between}}$ represents an acoustic time difference; $\Delta H$ represents a sampling interval for well logging curve data; and $T_d$ represents the two-way travel time of seismic waves; and the time-depth relationship is represented as a one-to-one correspondence between a time vector T and a depth vector Depth.

In some preferred implementations, step S400 specifically includes:
setting a time window with a preset size;
calculating a velocity vector of a current location based on elements of the time-depth conversion relationship within the range of the time window with a preset size:

$$v_i = \frac{(\text{Depth}_{i+1} - \text{Depth}_i)}{(T_{i+1} - T_i)}$$

$\text{Depth}_{i+1}$ represents an $(i+1)^{th}$ depth vector, $\text{Depth}_i$ represents an $i^{th}$ depth vector, $T_{i+1}$ represents an $(i+1)^{th}$ time vector, $T_i$ represents an $i^{th}$ time vector, $T_i \in T$, and $v_i$ represents a velocity vector of the $i^{th}$ element; and sliding the time window, calculating the velocity vector at the current location until all elements are traversed, and completing calculation of the velocity vector to obtain the one-dimensional velocity curve.

In some preferred implementations, a method for obtaining a velocity value prediction model based on wave impedance at the current depth includes:
obtaining a one-dimensional velocity curve training dataset, and performing forward propagation:

$$z^l = w^l a^{l-1} + b^l$$

$$a^l = \sigma(z^l)$$

where $z^l$ represents neuron input of a $l^{th}$ layer, $w^l$ represents a connection weight value of a lth layer, $a^l$ represents neuron output of a l th layer, $a^{l-1}$ represents neuron output of a l–1th layer, and $b^l$ represents the number of bias terms in a lth layer;

where a cost function is:

$$C = \frac{1}{2} \sum_j (y_j - a_z^l)^2$$

$y_j$ represents the actual value, and j is the sequence number of the element in the vector;

an error $\delta_j^l$ in forward calculation of each neural network layer is:

$$\delta_j^l = \frac{\partial C}{\partial z_j^l} = \sum_K \frac{\partial C}{\partial z_K^{l+1}} \frac{\partial z_K^{l+1}}{\partial a_j^l} \frac{\partial a_j^l}{\partial z_j^l} = \sum_K \delta_K^{l+1} \frac{\partial (w_{jK}^{l+1} a_j^l + b_K^{l+1})}{\partial a_j^l} \cdot \sigma'(z_j^l) =$$

$$\sum_K \delta_K^{l+1} \cdot w_{jK}^{l+1} \cdot \sigma'(z_j^l) = ((w^{l+1})^T \delta^{l+1}) \odot \sigma'(z^l)$$

a gradient of a weight, which is a partial derivative of an objective function over the weight, is:

$$\frac{\partial C}{\partial w_{jK}^l} = \frac{\partial C}{\partial z_j^l} \cdot \frac{\partial z_j^l}{\partial w_{jK}^l} = \delta_j^l \cdot \frac{\partial (w_{jK}^l a_K^{l-1} + b_j^l)}{\partial w_{jK}^l} = a_K^{l-1} \delta_j^l$$

a gradient of a bias, which is a derivative of the objective function over the bias, is:

$$\frac{\partial C}{\partial b_j^l} = \frac{\partial C}{\partial z_j^l} \cdot \frac{\partial z_j^l}{\partial b_j^l} = \delta_j^l \cdot \frac{\partial (w_{jK}^l a_K^{l-1} + b_j^l)}{\partial b_j^l} = \delta_j^l$$

an error in the forward propagation is:

$$\delta^l = \nabla_a C \odot \sigma'(Z^l)$$

an error in back propagation is:

$$\delta^l = ((w^{l+1})^T \delta^{l+1}) \odot \sigma'(z^l)$$

updating parameters by a gradient descent method:

$$w^l \to w^l - \frac{\eta}{\zeta} \sum_X \delta^{X,l} (a^{X,l-1})^T$$

$$b^l \to b^l - \frac{\eta}{\zeta} \sum_X \delta^{X,l}$$

and performing repeated iteration until the error is below a preset error threshold, or reaches the preset number of iterations, to obtain a trained velocity value prediction model based on wave impedance at the current depth.

In some preferred implementations, step S600 specifically includes:

setting an unknown underground wave impedance model parameter m as a g-dimensional space vector m={$m_1, \ldots, m_g$};

obtaining observation data d through a single acquisition process, that is, the one-dimensional velocity curve is a k-dimensional data vector d={d1, . . . , dx};

establishing relationship between the unknown underground wave impedance model parameter and the k-dimensional data vector through a non-linear function kernel G, to obtain a forward model:

$$d = G(m) + n$$

where n={$n_1, \ldots, n_k$} represents random noise that is independent of the underground wave impedance model parameter m and follows Gaussian distribution;

constructing an inversion objective function based on the forward model:

$$\min F[d, G(m)] = \min \|d - G(m)\|_2^2$$

where F is a mean square error between observation data d and prediction data G (m);

performing linear solving on the inversion objective function;

performing Taylor expansion on the forward model, and omitting higher-order terms of more than two orders to obtain a simplified representation of the prediction data:

$$\Delta G(m) = G(m) - G(m^0) = A \Delta m = A(m - m^0)$$

where $m^0$ represents an initial model established based on prior information, A is a Jacobian matrix, and elements of A are first-order partial differentials $\partial G_i / \partial m_j$;

assuming $d_0 = G(m^\sigma) + \xi_2$, $\Delta d = d - d_0$, $\xi_2$ represents the random noise, and an iterative equation of the forward model is:

$$m^{t+1} = m^t + \Delta m$$

where $m^t$ represents a forward model after iteration of t times, $m^{t+1}$ represents a forward model after iteration of (t+1) times, and $d_0$ represents prediction data with noise;

obtaining a pre-stack depth domain migration seismic profile d' through a single acquisition process, assuming that parameters in the inversion depth domain model have prior probability distribution P(M=m), according to a Bayes formula, the probability distribution is:

$$P(M = m \mid D = d') = \frac{P(D = d' \mid M = m) P(M = m)}{P(D = d')}$$

probability distribution with the random noise added is:

$$P(D = d' \mid M = m) =$$

$$P(n) = \frac{1}{(2\pi)^{\frac{n}{2}} |\det C_n|^{\frac{1}{2}}} \exp\{-[d' - G(m)]^T C_n^{-1} [d' - G(m)]\}$$

where $C_n$ is a noise covariance matrix, $C_n^{-1}$ is an inverse operation of the noise covariance matrix, and det is obtaining a determinant of a corresponding matrix;

if n is noise and follows the Gaussian distribution with a mean value of 0, and $C_n$ is an equivalent diagonal matrix with diagonal elements representing a variance $\sigma_n^2$ of the data center containing noise, the probability distribution with the random noise added is deformed as follows:

$$P(D = d' | M = m) = \prod \frac{1}{(2\pi)^{\frac{n}{2}} \sigma_n} \exp\{-\sigma_n^{-2} \sum [d' - G(m)]^2\}$$

for the prior probability distribution P(M=m) of the parameters in the inversion depth domain model, setting the initial model $m^0$, where $m = m^0 + \Delta m$, and the probability distribution of an equivalent depth domain model is $P(M=m)=P(m=m^0+\Delta m)=P(\Delta m=m-m^0)$;

assuming that the probability distribution of the equivalent depth domain model follows the Gaussian distribution, probability distribution of a depth domain model with the random noise added is:

$$P(M = m) = \frac{1}{(2\pi)^{\frac{n}{2}} |\det C_{\Delta m}|^{1/2}} \exp\{-[m - m^0]^T C_{\Delta m}^{-1} [m - m^0]\}$$

assuming that mean values of parameters of the depth domain model and the initial model $m^0$ are equivalent and do not affect each other, probability distribution of a simplified depth domain model is:

$$P(M = m) = \prod \frac{1}{(2\pi)^{\frac{n}{2}} \sigma_m} \exp\{-\sigma_m^{-2} \sum [m - m^0]^2\}$$

where $\sigma_m^2$ represents a variance value of an actual model relative to the given initial model;

a denominator P(D=d) in deformation of the probability distribution with the random noise added depends on data acquisition and processing, and is set as a constant, and maximizing posterior probability is equivalent to maximizing a numerator, to make a posterior probability distribution formula maximum:

$$P(M = m \mid D = d') = \prod \frac{1}{(2\pi)^n \sigma_n \sigma_m} \exp\{-\sigma_n^{-2}[d' - (G(m)]^2 - \sigma_m^{-1} \sum [m - m^0]^2\}$$

an equivalent formula for the posterior probability distribution formula to be maximum is:

$$F(m) = \sigma_n^{-2} \Sigma [d' - G(m)]^2 + \sigma_m^{-2} \Sigma [m - m^0]^2 \to 0$$

letting the partial derivative relevant to the model parameter m be equal to zero, $G(m) = G(m^0) + A\Delta m$, $\Delta m = m - m^0$, obtaining a matrix equation:

$$\frac{\partial F(m)}{\partial m} = \sigma_n^{-2}[d' - G(m^0) - A\Delta m]IA - \sigma_m^{-2} I\Delta m = 0$$

$$d'I\sigma_n^{-2}A - \sigma_m^{-2} I\Delta m - G(m^0)\sigma_n^{-2} IA - A\Delta m I \sigma_n^{-2} A = 0$$

where $$A_{ij} = \frac{\partial G_i}{\partial m_j},$$

I is a unit matrix, $\Delta m$ is a wave impedance iteration matrix, and a basic formula of random inverse inversion is sorted out:

$$[d' - G(m^0)]A = [AA^T + \sigma_n^2 \sigma_m^{-2} I] \Delta m$$

$$\Delta m = [AA^T + \sigma_n^2 \sigma_m^{-2} I]^{-1} A^T [d' - G(m^0)]$$

an iteration formula for the basic formula of the random inverse inversion is: $m^{t+1} = m^t + \Delta m$;
where $G(m^0)$ is a depth domain synthetic seismogram formed by a parameter model; and
by continuously iterating and updating the parameters of the unknown underground wave impedance model until positive and negative value oscillation occurs in $\Delta m$, $m^{t+1}$ at this time is the wave impedance inversion data volume.

On the other hand, the present invention provides a high-precision modeling system of a three-dimensional velocity field for precise navigation of deep oil and gas, including:
a data acquisition and standardization module, configured to acquire well logging data, process outliers, perform standardization to obtain standardized well logging data, and acquire seismic data;
a wave impedance curve extraction module, configured to extract wave impedance characteristics based on the standardized well logging data to obtain a wave impedance curve;
a time-depth conversion relationship calculation module, configured to perform well-to-seismic calibration based on the wave impedance curve and the seismic data to obtain time-depth conversion relationship;
a velocity curve acquisition module, configured to, based on the time-depth conversion relationship, acquire a velocity vector of each location at current depth by a time window with a set size, to obtain a one-dimensional velocity curve;
a prediction model acquisition module, configured to, based on the velocity curve, train a velocity value prediction model based on wave impedance at the current depth;
a wave impedance inversion data volume calculation module, configured to perform wave impedance inversion based on the one-dimensional velocity curve at the current depth to obtain a wave impedance inversion data volume; and
a three-dimensional high-precision velocity field acquisition module, configured to, based on the wave impedance inversion data volume, through the velocity value prediction model based on wave impedance at the current depth, obtain a three-dimensional high-precision velocity volume.

The present invention has the following beneficial effects:
(1) The present invention proposes a high-precision velocity volume calculation method for strata based on wave impedance inversion, and velocity information in single well time-depth relationship is fully extracted on the basis of directly calculating velocity from an acoustic time difference curve, avoiding velocity calculation deviation caused by instruments and well condition factors; and precise single well velocity information is extrapolated to three-dimensional space under the constraint of macroscopic trend changes in wave impedance, providing a reference basis for precise navigation of deep oil and gas.

BRIEF DESCRIPTION OF DRAWINGS

By reading detailed description of non-limiting embodiments made with reference to the following drawings, other features, objectives, and advantages of the present application will become more apparent:
The FIGURE is a schematic flowchart of a high-precision modeling method of three-dimensional velocity field for precise navigation of deep oil and gas according to embodiments of the present invention.

DETAILED DESCRIPTION OF THE EMBODIMENTS

Figure 1:
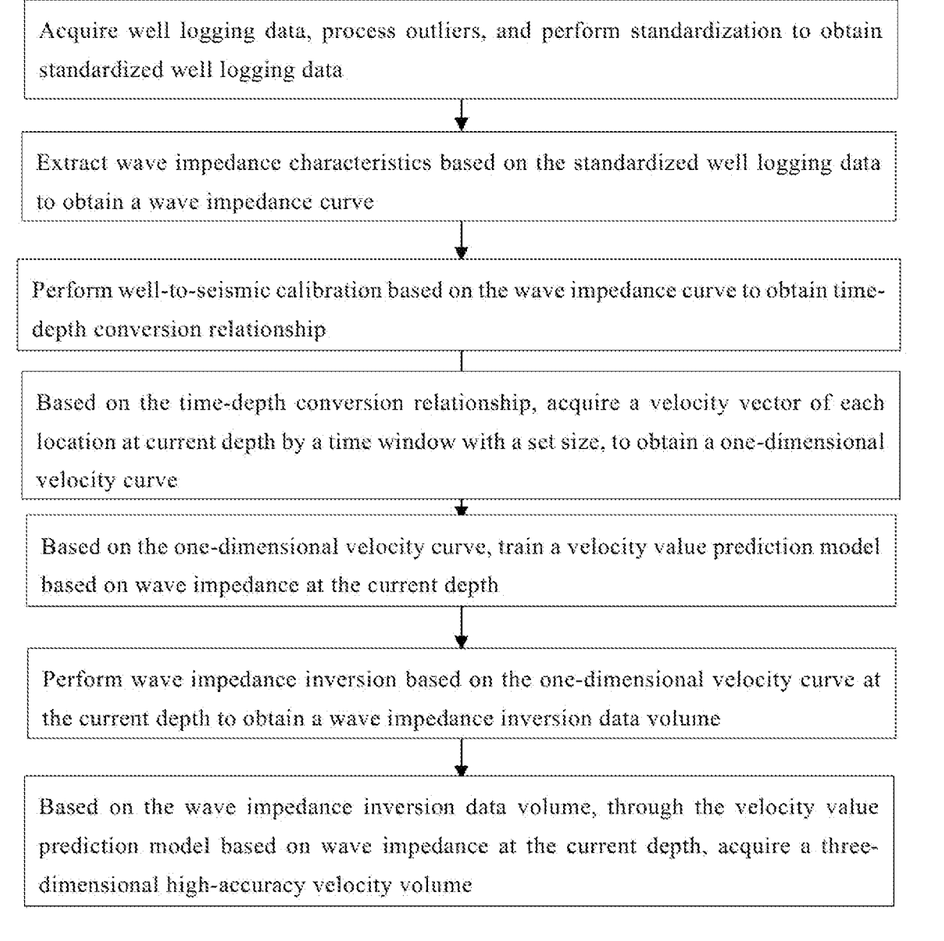

The present application will be further described in detail below in conjunction with accompanying drawings and embodiments. It should be understood that the specific embodiments described herein are merely intended to explain related invention, rather than to limit the present invention. It should also be noted that, for convenience of description, only the parts related to relevant invention are shown in the accompany drawings.

It should be noted that, without conflict, the embodiments in the present application and the features in the embodiments can be combined with each other. The present application will be described in detail below with reference to the accompanying drawings and the embodiments.

In order to provide a clearer explanation of a high-precision modeling method of a three-dimensional velocity field for precise navigation of deep oil and gas of the present invention, the following will elaborate on each step in the embodiments of the present invention in conjunction with the FIGURE.

The high-precision modeling method of a three-dimensional velocity field for precise navigation of deep oil and gas in a first embodiment of the present invention includes step S100 to step S700, and each step is described in detail as follows:

step S100, well logging data is acquired, outliers are processed, standardization is performed to obtain standardized well logging data, and seismic data is acquired.

In the embodiment, a method for obtaining standardized well logging data includes:

step A10, using the well logging data as a dataset X to be processed;

step A20, randomly extracting $\varphi$ data points from the dataset X to be processed, to form a data subset X' to be processed, and storing the data subset to be processed in a root node;

step A30, randomly selecting a dimension q from the dataset X to be processed, and randomly generating a split point p in the dimension q, where the split point p satisfies $\min(x_{ij}, j=q, x_{ij} \in X') < p < \max(x_{ij}, j=q, x_{ij} \in X')$, and j represents a serial number of the split point;

step A40, generating, based on a split point p, a hyperplane that divides data in the dimension q into two subspaces, and placing data points with values smaller than p in the dimension q into a first leaf node, and data points with values greater than or equal to p into a second leaf node;

step A50, performing recursion on the methods described in steps A30 to A40 until all the leaf nodes have only one data point or isolation trees have reached a preset height;

step A60, repeating the methods described in steps A30 to A50 until T isolation trees are generated, where the T isolation trees represent: each of the isolation trees has no external node of a leaf node, or has two leaf nodes $\{T_l, T_r\}$ and one internal node test; the internal node test of each of the T isolation trees consists of the dimension q and a split point p, the points with q<p belong to $T_l$, and otherwise, the points belong to $T_r$;

step A70, calling the T isolation trees an isolation tree forest, letting each data point $x_i$ traverse through each isolation tree, and calculating heights $h(x_i)$ of the data points $x_i$ in each isolation tree, namely the number of edges that the data points $x_i$ pass through from the root node to the leaf nodes of the isolation tree where the data points are located; and thus, calculating the average height of the data points $x_i$ in the isolation tree forest, and normalizing the average heights of all the data points to obtain a normalized average height $\overline{h(x_i)}$ of the data points;

step A80, calculating an outlier score $s(x, \varphi)$ based on the normalized average height $\overline{h(x_i)}$ of the data points:

$$s(x, \varphi) = 2^{\frac{E(\overline{h(x_i)})}{\overline{c(\varphi)}}}$$

where $\overline{c(\varphi)}$ represents a mean value of the binary tree path lengths constructed by $\varphi$ data points, and $E(*)$ represents an expectation;

$$\overline{c(\varphi)} = \begin{cases} 2H(\varphi - 1) - \frac{2(\varphi - 1)}{\varphi}, & \varphi > 2 \\ 1, & \varphi = 2 \\ 0, & \varphi < 2 \end{cases}$$

H(i) represents harmonic a number, and is estimated through ln(i)+0.5772156649, and 0.5772156649 is Euler's constant; and when the outlier score $S(x, \varphi)$ is less than a preset outlier threshold, removing the corresponding data points to obtain well logging data $C = \{c_1, \ldots, C_\alpha, \ldots c_m\}$. $1 \leq \alpha \leq m$, and $c_\alpha \in C$ without outliers, where m represents the number of the data points in the well logging data without outliers; and step A90, standardizing the continuous well logging data without outliers to obtain standardized well logging data:

$$c_z^s = \frac{(g_z^s - \text{Average}(g^s))}{v^s}$$

where $g_z^s$ represents a data value of a $z^{th}$ sampling point on a $s^{th}$ type of curve, and Average represents the calculated mean value; $g^s$ represents all data sample points on a $s^{th}$ type of curve; $v^s$ represents a variance of a $s^{th}$ type of curve; and $c_z^s$ represents the data value of the $z^{th}$ sampling point on the $s^{th}$ type of curve after standardization.

Step S200, wave impedance characteristics are extracted based on the standardized well logging data to obtain a wave impedance curve.

In the embodiment, step S200 includes:

selecting a standardized compensation acoustic curve AC and a standardized density curve DEN based on the standardized well logging data, and calculating a wave impedance curve IMP of a target well:

IMP=DEN/AC.

Step S300, well-to-seismic calibration is performed based on the wave impedance curve and the seismic data to obtain time-depth conversion relationship.

In the embodiment, a method for obtaining time-depth conversion relationship includes:

tracking wave peak points of reflection events based on the well logging data, constructing a continuous surface of the reflection events, then determining the reflection event where a marker bed is located, and constructing isochronous three-dimensional distribution of the marker bed;

obtaining a wave impedance curve by multiplying an acoustic time difference curve by a density curve in the well logging data of each known well location, and then calculating a reflection coefficient curve;

constructing a ricker wavelet based on dominant frequency of seism in the target interval, and performing convolution computation on the ricker wavelet and the reflection coefficient curve to obtain a synthetic seismogram;

enabling depth data of a marker bed at a borehole of each drilling well location to correspond to a three-dimensional distribution model of the marker bed, calculating correlation of seismic data after the synthetic seismogram overlays a near-well seismic trace, when waveform correlation is higher than a first relevant threshold, completing well-to-seismic calibration, and finally obtaining time-depth conversion relationship between well logging depth and two-way travel time of seismic reflection waves:

$$T_d = T_{H_0} + 2 \sum_{Z_{between}=1}^{n_{between}} T_{Z_{between}} \cdot \Delta H$$

where $T_{H_0}$ represents two-way travel time of seismic data corresponding to depth of an acoustic well logging marker bed; $T_{Z_{between}}$ represents an acoustic time difference; $\Delta H$ represents a sampling interval for well logging curve data; and $T_d$ represents the two-way travel time of seismic waves; and the time-depth relationship is represented as a one-to-one correspondence between a time vector T and a depth vector Depth.

Step S400, based on the time-depth conversion relationship, a velocity vector of each location at current depth is acquired by a time window with a set size, to obtain a one-dimensional velocity curve.

In the embodiment, step S400 specifically includes:

setting a time window with a preset size;

calculating a velocity vector of a current location based on elements of the time-depth conversion relationship within the range of the time window with a preset size:

$$v_i = \frac{(Depth_{i+1} - Depth_i)}{(T_{i+1} + T_i)}$$

$Depth_{i+1}$ represents an (i+1) th depth vector, $Depth_i$ represents an $i^{th}$ depth vector, $T_{i+1}$ represents an (i+1) th time vector, $T_i$ represents an ith time vector, $T_i \in T$, and $v_i$ represents a velocity vector of the ith element; and sliding the time window, calculating the velocity vector at the current location until all elements are traversed, and completing calculation of the velocity vector to obtain the one-dimensional velocity curve.

Step S500, based on the one-dimensional velocity curve, a velocity value prediction model is trained based on wave impedance at the current depth.

In the embodiment, a method for obtaining the velocity value prediction model based on wave impedance at the current depth includes:

obtaining a one-dimensional velocity curve training dataset, and performing forward propagation:

$$z^l = w^l a^{l-1} + b^l$$

$$a^l = \sigma(z^l)$$

where $z^l$ represents neuron input of a lth layer, $w^l$ represents a connection weight value of a lth layer, $a^l$ represents neuron output of a lth layer, $a^{l-1}$ represents neuron output of a l−1th layer, and $b^l$ represents the number of bias terms in a lth layer;

where a cost function is:

$$C = \frac{1}{2} \sum_j (y_j - a_j^l)^2$$

$y_j$ represents the actual value, and j is the sequence number of the element in the vector;

an error $\delta_j^l$ in forward calculation of each neural network layer is:

$$\delta_j^l = \frac{\partial C}{\partial z_j^l} = \sum_K \frac{\partial C}{\partial z_K^{l+1}} \frac{\partial z_K^{l+1}}{\partial a_j^l} \frac{\partial a_j^l}{\partial z_j^l} = \sum_K \delta_K^{l+1} \frac{\partial (w_{jK}^{l+1} a_j^l + b_K^{l+1})}{\partial a_j^l} \cdot \sigma'(z_j^l) =$$

$$\sum_K \delta_K^{l+1} \cdot w_{jK}^{l+1} \cdot \sigma'(z_j^l) = ((w^{l+1})^T \delta^{l+1}) \odot \sigma'(z^l)$$

a gradient of a weight, which is a partial derivative of an objective function over the weight, is:

$$\frac{\partial C}{\partial w_{jK}^l} = \frac{\partial C}{\partial z_j^l} \cdot \frac{\partial z_j^l}{\partial w_{jK}^l} = \delta_j^l \cdot \frac{\partial (w_{jK}^l a_K^{l-1} + b_j^l)}{\partial w_{jK}^l} = a_K^{l-1} \delta_j^l$$

a gradient of a bias, which is a derivative of the objective function over the bias, is:

$$\frac{\partial C}{\partial b_j^l} = \frac{\partial C}{\partial z_j^l} \cdot \frac{\partial z_j^l}{\partial b_j^l} = \delta_j^l \cdot \frac{\partial (w_{jK}^l a_K^{l-1} + b_j^l)}{\partial b_j^l} = \delta_j^l$$

an error in the forward propagation is:

$$\delta^l = \nabla_a C \mathbin{\lrcorner} \sigma'(Z^l)$$

an error in back propagation is:

$$\delta^l = ((w^{l+1})^T \delta^{l+1}) \mathbin{\lrcorner} \sigma'(z^l)$$

updating parameters by a gradient descent method:

$$w^l \to w^l - \frac{\eta}{\zeta} \sum_X \delta^{X,l} (a^{X,l-1})^T$$

$$b^l \to b^l - \frac{\eta}{\zeta} \sum_X \delta^{X,l}$$

performing repeated iteration until the error is below a preset error threshold, or reaches a preset number of iterations, to obtain a trained velocity value prediction model based on wave impedance at the current depth.

In the embodiment, training data includes a single well velocity curve and a single well wave impedance curve. By using a one-dimensional velocity curve of a single well as a label, mapping relationship between the wave impedance curve and the velocity curve is established.

Step S600, wave impedance inversion is performed based on the one-dimensional velocity curve at the current depth to obtain a wave impedance inversion data volume.

In the embodiment, step S600 specifically includes:

setting an unknown underground wave impedance model parameter m as a g-dimensional space vector m={$m_1, \ldots, m_g$};

obtaining observation data d through a single acquisition process, that is, the one-dimensional velocity curve is a k-dimensional data vector d={$d_1, \ldots, d_k$};

establishing relationship between the unknown underground wave impedance model parameter and the k-dimensional data vector through a non-linear function kernel G, to obtain a forward model:

$$d = G(m) + n$$

where n={$n_1, \ldots, n_k$} represents random noise that is independent of the underground wave impedance model parameter m and follows Gaussian distribution;

constructing an inversion objective function based on the forward model:

$$\min F[d, G(m)] = \min \|d - G(m)\|_2^2$$

where F is a mean square error between observation data d and prediction data G (m);

performing linear solving on the inversion objective function;

performing Taylor expansion on the forward model, and omitting higher-order terms of more than two orders to obtain a simplified representation of the prediction data:

$$\Delta G(m) = G(m) - G(m^0) = A\Delta m = A(m - m^0)$$

where $m^0$ represents an initial model established based on prior information, A is a Jacobian matrix, and elements of A are first-order partial differentials $\partial G_i/\partial m_j$;

assuming $d_0 = G(m^0) + \xi_2$, $\Delta d = d - d_0$, $\xi_2$ represents the random noise, and an iterative equation of the forward model is:

$$m^{t+1} = m^t + \Delta m$$

where $m^t$ represents a forward model after iteration of t times, $m^{t+1}$ represents a forward model after iteration of (t+1) times, and $d_0$ represents prediction data with noise;

obtaining a pre-stack depth domain migration seismic profile d' through a single acquisition process, assuming that parameters in the inversion depth domain model have prior probability distribution P(M=m), according to a Bayes formula, the probability distribution is:

$$P(M = m|D = d') = \frac{P(D = d'|M = m)P(M = m)}{P(D = d')}$$

probability distribution with the random noise added is:

$$P(D = d'|M = m) =$$

$$P(n) = \frac{1}{(2\pi)^{\frac{n}{2}} |\det C_n|^{\frac{1}{2}}} \exp\{-[d' - G(m)]^T C_n^{-1}[d' - G(m)]\}$$

where $C_n$ is a noise covariance matrix, $C_n^{-1}$ is an inverse operation of the noise covariance matrix, and det is obtaining a determinant of a corresponding matrix;

if n is noise and follows the Gaussian distribution with a mean value of 0, and $C_n$ is an equivalent diagonal matrix with diagonal elements representing a variance $\sigma_n^2$ of the data center containing noise, the probability distribution with the random noise added is deformed as follows:

$$P(D = d'|M = m) = \prod \frac{1}{(2\pi)^{\frac{n}{2}} \sigma_n} \exp\{-\sigma_n^{-2} \sum [d' - G(m)]^2\}$$

for the prior probability distribution P(M=m) of the parameters in the inversion depth domain model, setting the initial model $m^0$, where $m = m^0 + \Delta m$, and the probability distribution of an equivalent depth domain model is $P(M=m) = P(m = m^0 + \Delta m) = P(\Delta m = m - m^0)$;

assuming that the probability distribution of the equivalent depth domain model follows the Gaussian distribution, probability distribution of a depth domain model with the random noise added is:

$$P(M = m) = \frac{1}{(2\pi)^{\frac{n}{2}} |\det C_{\Delta m}|^{1/2}} \exp\{-[m - m^0]^T C_{\Delta m}^{-1}[m - m^0]\}$$

assuming that mean values of parameters of the depth domain model and the initial model $m^0$ are equivalent and do not affect each other, probability distribution of a simplified depth domain model is:

$$P(M = m) = \frac{1}{(2\pi)^{\frac{n}{2}} \sigma_m} \exp\{-\sigma_m^{-2} \sum [m - m^0]^2\}$$

where $\sigma_m^2$ represents a variance value of an actual model relative to the given initial model;

a denominator P(D=d') in deformation of the probability distribution with the random noise added depends on data acquisition and processing, and is set as a constant, and maximizing posterior probability is equivalent to maximizing a numerator, to make a posterior probability distribution formula maximum:

$$P(M = m|D = d') =$$

$$\prod \frac{1}{(2\pi)^n \sigma_n \sigma_m} \exp\{-\sigma_n^{-2} \sum [d' - G(m)]^2\} - \sigma_m^2 \sum [m - m^0]^2\}$$

an equivalent formula for the posterior probability distribution formula to be maximum is:

$$F(m) = \sigma_n^{-2} \Sigma [d' - G(m)]^2 + \sigma_m^{-2} \Sigma [m - m^0]^2 \to 0$$

letting the partial derivative relevant to the model parameter m be equal to zero, $G(m) = G(m^0) + A\Delta m$, $\Delta m = m - m^0$, obtaining a matrix equation:

$$\frac{\partial F(m)}{\partial m} = \sigma_n^{-2}[d' - G(m^0) - A\Delta m]IA - \sigma_m^{-2}I\Delta m = 0$$

$$d'I\sigma_n^{-2}A - \sigma_m^{-2}I\Delta m - G(m^0)\sigma_n^{-2}IA - A\Delta m I \sigma_n^{-2}A = 0$$

where $$A_{ij} = \frac{\partial G_i}{\partial m_j},$$

I is a unit matrix, $\Delta m$ is a wave impedance iteration matrix, and a basic formula of random inverse inversion is sorted out:

$$[d' - G(m^0)]A = [AA^T + \sigma_n^2 \sigma_m^{-2}I]\Delta m$$

$$\Delta m = [AA^T + \sigma_n^2 \sigma_m^{-2}I]^{-1} A^T [d' - G(m^0)]$$

an iteration formula for the basic formula of the random inverse inversion is: $m^{t+1} = m^t + \Delta m$;

where $G(m^0)$ is a depth domain synthetic seismogram formed by a parameter model; and by continuously iterating and updating the parameters of the unknown underground wave impedance model until positive and negative value oscillation occurs in $\Delta m$, $m^{r+1}$ at this time is the wave impedance inversion data volume.

Step S700, based on the wave impedance inversion data volume, through the velocity value prediction model based on wave impedance at the current depth, a three-dimensional high-precision velocity volume is acquired.

Although steps in the above embodiments are described in sequence described above, those skilled in the art can understand that in order to achieve effects of the embodiments, different steps do not need to be executed in this order but can be executed simultaneously (in parallel) or in a reverse order. These simple changes are within the scope of protection of the present invention.

A second embodiment of the present invention provides a high-precision modeling system of three-dimensional velocity field for precise navigation of deep oil and gas, including:
- a data acquisition and standardization module, configured to acquire well logging data, process outliers, perform standardization to obtain standardized well logging data, and acquire seismic data;
- a wave impedance curve extraction module, configured to extract wave impedance characteristics based on the standardized well logging data to obtain a wave impedance curve;
- a time-depth conversion relationship calculation module, configured to perform well-to-seismic calibration based on the wave impedance curve and the seismic data to obtain time-depth conversion relationship;
- a velocity curve acquisition module, configured to, based on the time-depth conversion relationship, acquire a velocity vector of each location at current depth by a time window with a set size, to obtain a one-dimensional velocity curve;
- a prediction model acquisition module, configured to, based on the velocity curve, train a velocity value prediction model based on wave impedance at the current depth;
- a wave impedance inversion data volume calculation module, configured to perform wave impedance inversion based on the one-dimensional velocity curve at the current depth to obtain a wave impedance inversion data volume; and
- a three-dimensional high-precision velocity field acquisition module, configured to, based on the wave impedance inversion data volume, through the velocity value prediction model based on wave impedance at the current depth, obtain a three-dimensional high-precision velocity volume.

Those skilled in the technical art can clearly understand that, for convenience and brevity of description, reference can be made to corresponding processes in the foregoing method embodiments for specific working processes and relevant explanation of the above-described systems. Details are not described herein again.

It should be noted that the high-precision modeling system of three-dimensional velocity field for precise navigation of deep oil and gas provided by the above embodiments is only described by division of various functional modules mentioned above. In practice application, the functions can be completed by distributing to different functional modules as needed, that is, the modules or the steps in the embodiments of the present invention are re-divided or combined, for example, the modules in the above embodiments can be merged into one module or further split into multiple sub-modules to complete all or part of the functions described above. Names of the modules and the steps involved in the embodiments of the present invention are only for the purpose of distinguishing each module or step, and are not considered as inappropriate limitations to the present invention.

Those skilled in the technical art can clearly understand that, for convenience and brevity of description, reference can be made to corresponding processes in the foregoing method embodiments for specific working processes and relevant explanation of the above-described storing apparatuses and processing apparatuses. Details are not described herein again.

Those skilled in the art should be aware that the modules, methods and steps in examples described in combination with the embodiments disclosed herein can be implemented in electronic hardware, computer software, or a combination of the two. Programs corresponding to software modules, the methods and the steps may be placed in random access memory (RAM), memory, read-only memory (ROM), electrically programmable ROM, electrically erasable programmable ROM, registers, hard disks, removable disks, CD-ROMs, or any other form of storage medium known in the technical field. In order to clearly illustrate interchangeability of electronic hardware and software, composition and steps of each example have been described in general terms of functionality in the above description. Whether these functions are implemented in electronic hardware or software depends on specific applications of the technical solutions and design constraints. Those skilled in the art may use different methods to implement the described functions for each specific application, but such implementation should not be considered to be beyond the scope of the present invention.

Terms "first", "second", and so on are intended to distinguish between similar objects but do not describe or indicate a specific order or sequence.

A term "include", or any other similar terms are intended to cover non-exclusive including, so that a process, a method, an article, or a device/apparatus including a series of elements not only includes those elements, but also includes other elements that are not explicitly listed, or also includes inherent elements of the process, the method, the article, or the device/apparatus.

Thus, the technical solution of the present invention has been described in conjunction with the preferred embodiments as shown in the drawings. However, it is easy for those skilled in the art to understand that the scope of protection of the present invention is clearly not limited to these specific embodiments. On the premise of not deviating from the principles of the present invention, those skilled in the art may make equivalent changes or replacements to the relevant technical features, and the technical solutions after these changes or replacements will fall within the scope of protection of the present invention.

What is claimed is:
1. A high-precision modeling method of a three-dimensional velocity field for precise navigation of deep oil and gas, comprising:
   step S100, acquiring well logging data, processing outliers, performing standardization to obtain standardized well logging data, and acquiring seismic data:
   step S200, extracting wave impedance characteristics based on the standardized well logging data to obtain a wave impedance curve:
   step S300, performing well-to-seismic calibration based on the wave impedance curve and the seismic data to obtain time-depth conversion relationship;

17 step S400, based on the time-depth conversion relationship, acquiring a velocity vector of each location at current depth by a time window with a set size, to obtain a one-dimensional velocity curve;

step S500, based on the one-dimensional velocity curve, training a velocity value prediction model based on wave impedance at the current depth;

step S600, performing wave impedance inversion based on the one-dimensional velocity curve at the current depth to obtain a wave impedance inversion data volume; and step S700, based on the wave impedance inversion data volume, using the velocity value prediction model based on wave impedance at the current depth, acquiring a three-dimensional high-precision velocity volume.

2. The high-precision modeling method of a three-dimensional velocity field for precise navigation of deep oil and gas according to claim 1, wherein a method for obtaining the standardized well logging data comprises:

step A10, using the well logging data as a dataset X to be processed;

step A20, randomly extracting $\varphi$ data points from the dataset X to be processed, to form a data subset X' to be processed, and storing the data subset to be processed in a root node;

step A30, randomly selecting a dimension q from the dataset X to be processed, and randomly generating a split point p in the dimension q, wherein the split point p satisfies $\min(x_{i,\xi}, \xi=q, x_{i,\xi}\in X')<p<\max(x_{i,\xi}, \xi=q, x_{i,\xi}\in X')$, and $\xi$ represents a serial number of the split point;

step A40, generating, based on a split point p, a hyperplane that divides data in the dimension q into two subspaces, and placing data points with values smaller than p in the dimension q into a first leaf node, and data points with values greater than or equal to p into a second leaf node;

step A50, performing recursion on the methods described in steps A30 to A40 until all the leaf nodes have only one data point or isolation trees have reached a preset height, wherein a height of the isolation trees grows with a number of times the hyperplane is generated;

step A60, repeating the methods described in steps A30 to A50 until $T_{iso}$ isolation trees are generated, wherein the $T_{iso}$ isolation trees represent: each of the isolation trees has no external node of a leaf node, or has two leaf nodes $\{T_l, T_r\}$ and one internal node test: the internal node test of each of the $T_{iso}$ isolation trees consists of the dimension q and a split point p, the points with q<p belong to $T_l$, and otherwise, the points belong to $T_r$;

step A70, calling the $T_{iso}$ isolation trees an isolation tree forest, letting each data point $x_i$ traverse through each isolation tree, and calculating heights $h(x_i)$ of the data points $x_i$ in each isolation tree, namely the number of edges that the data points $x_i$ pass through from the root node to the leaf nodes of the isolation tree where the data points are located; and thus, calculating the average height of the data points $x_i$ in the isolation tree forest, and normalizing the average heights of all the data points to obtain a normalized average height $\overline{h(x_i)}$ of the data points;

18 step A80, calculating an outlier score $s(x, \varphi)$ based on the normalized average height $\overline{h(x_i)}$ of the data points:

$$s(x, \varphi) = 2^{\frac{E(\overline{h(x_i)})}{\overline{c(\varphi)}}},$$

wherein
$\overline{c(\varphi)}$ represents a mean value of the binary tree path lengths constructed by $\varphi$ data points, and $E(*)$ represents an expectation;

$$\overline{c(\varphi)} = \begin{cases} 2H(\varphi-1) - \frac{2(\varphi-1)}{\varphi}, & \varphi > 2 \\ 1, & \varphi = 2 \\ 0, & \varphi < 2 \end{cases},$$

wherein
$H(\bullet)$ represents a harmonic number, and is estimated through $\ln(i)+0.5772156649$, and $0.5772156649$ is Euler's constant; and
when the outlier score $s(x, \varphi)$ is less than a preset outlier threshold $S_s$, removing the corresponding data points to obtain well logging data $C=\{C_1, \ldots, C_\alpha, \ldots, C_{m_y}\}$, $1\leq\alpha\leq m_y$, and $C_\alpha\in C$ without outliers, wherein $m_y$ represents the number of the data points in the well logging data without outliers;

step A90, standardizing the continuous well logging data without outliers to obtain standardized well logging data:

$$c_z^s = \frac{(g_z^s - \text{Average}(g^s))}{v^s},$$

wherein $g_z^s$ represents a data value of the $z^{th}$ sampling point on the $s^{th}$ type of curve, and Average represents the calculated mean value; $g^s$ represents all data sample points on a $s^{th}$ type of curve; $v^s$ represents a variance of a $s^{th}$ type of curve; and $C_z^s$ represents the data value of the $z^{th}$ sampling point on the $s^{th}$ type of curve after standardization.

3. The high-precision modeling method of a three-dimensional velocity field for precise navigation of deep oil and gas according to claim 1, wherein the step S200 comprises:
selecting a standardized compensation acoustic curve AC and a standardized density curve DEN based on the standardized well logging data, and calculating a wave impedance curve IMP of a target well:
IMP=DEN/AC.

4. The high-precision modeling method of three-dimensional velocity field for precise navigation of deep oil and gas according to claim 1, wherein obtaining the time-depth conversion relationship comprises:
tracking wave peak points of reflection events based on the well logging data, constructing a continuous surface of the reflection events, then determining the reflection event where a marker bed is located, and constructing isochronous three-dimensional distribution of the marker bed;
obtaining a wave impedance curve by multiplying an acoustic time difference curve by a density curve in the well logging data of each known well location, and then calculating a reflection coefficient curve;
constructing a ricker wavelet based on dominant frequency of seism in the target interval, and performing convolution computation on the ricker wavelet and the reflection coefficient curve to obtain a synthetic seismogram;

enabling depth data of a marker bed at a borehole of each drilling well location to correspond to a three-dimensional distribution model of the marker bed, calculating correlation of the synthetic seismogram with a near-well seismic trace, when waveform correlation is higher than a first relevant threshold, completing well-to-seismic calibration, and finally obtaining time-depth conversion relationship between well logging depth and two-way travel time of seismic reflection waves:

$$T_d = T_{H_0} + 2 \sum_{Z_{between}=1}^{n_{between}} Tz_{between} \Delta H;$$

wherein $T_{H_0}$ represents two-way travel time of seismic data corresponding to depth of an acoustic well logging marker bed; $Tz_{between}$ represents an acoustic time difference; $\Delta H$ represents a sampling interval for well logging curve data; and $T_d$ represents the two-way travel time of seismic waves; and the time-depth relationship is represented as a one-to-one correspondence between a time vector $T_{time}$ and a depth vector Depth.

5. A high-precision modeling system of a three-dimensional velocity field for precise navigation of deep oil and gas, comprising:

a data acquisition and standardization module, configured to acquire well logging data, process outliers, perform standardization to obtain standardized well logging data, and acquire seismic data;

a wave impedance curve extraction module, configured to extract wave impedance characteristics based on the standardized well logging data to obtain a wave impedance curve;

a time-depth conversion relationship calculation module, configured to perform well-to-seismic calibration based on the wave impedance curve and the seismic data to obtain time-depth conversion relationship;

a velocity curve acquisition module, configured to, based on the time-depth conversion relationship, acquire a velocity vector of each location at current depth by a time window with a set size, to obtain a one-dimensional velocity curve;

a prediction model acquisition module, configured to, based on the one-dimensional velocity curve, train a velocity value prediction model based on wave impedance at the current depth;

a wave impedance inversion data volume calculation module, configured to perform wave impedance inversion based on the one-dimensional velocity curve at the current depth to obtain a wave impedance inversion data volume; and a three-dimensional high-precision velocity field acquisition module, configured to, based on the wave impedance inversion data volume, using the velocity value prediction model based on wave impedance at the current depth, obtain a three-dimensional high-precision velocity volume.

* * * * *